(12) United States Patent
Schonhoft et al.

(10) Patent No.: US 8,454,028 B1
(45) Date of Patent: Jun. 4, 2013

(54) FIXTURE FOR HOLDING A CHAMFERING TOOL DURING CUTTING INSERT PRESET OPERATION

(75) Inventors: Jason Schonhoft, West Harrison, IN (US); Ryan Johnson, Anna, OH (US); Shane Gaerke, Fort Recovery, OH (US); Tom Bickford, Sidney, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1106 days.

(21) Appl. No.: 12/410,941

(22) Filed: Mar. 25, 2009

(51) Int. Cl.
*B23B 31/02* (2006.01)
(52) U.S. Cl.
USPC .............................. 279/141; 279/89; 279/156
(58) Field of Classification Search
USPC .................................... 279/46.1, 89, 141, 156
IPC ........................................................ B23B 31/02
See application file for complete search history.

(56) References Cited

U.S. PATENT DOCUMENTS

| | | | | |
|---|---|---|---|---|
| 1,881,905 A * | 10/1932 | Page et al. ...................... | 279/106 |
| 2,931,659 A * | 4/1960 | Novkov ........................... | 279/35 |
| 4,679,802 A * | 7/1987 | Beal .............................. | 279/106 |
| 4,690,262 A * | 9/1987 | Hoyle ....................... | 192/111.12 |
| 4,779,382 A * | 10/1988 | Rudolf et al. ................. | 451/342 |
| 5,058,909 A * | 10/1991 | Rudolf et al. ..................... | 279/8 |
| 5,157,873 A * | 10/1992 | Rudolf et al. ................. | 451/342 |
| 6,367,816 B1 * | 4/2002 | Denzinger et al. ............ | 279/141 |
| 6,554,291 B2 * | 4/2003 | Turos ............................ | 279/133 |
| 6,910,694 B2 * | 6/2005 | Hartmann et al. ............. | 279/141 |
| 6,953,197 B2 * | 10/2005 | Hartmann ..................... | 279/141 |
| 6,974,287 B2 | 12/2005 | Neumeier | |
| 7,255,667 B2 | 8/2007 | Prust et al. | |
| 7,393,166 B2 * | 7/2008 | Chen ............................. | 409/234 |
| 2008/0075541 A1 | 3/2008 | Saeterbo et al. | |

\* cited by examiner

*Primary Examiner* — Eric A Gates
(74) *Attorney, Agent, or Firm* — Standley Law Group LLP (57) ABSTRACT

A fixture for facilitating the accurate and repeatable preset of chamfering tool cutting inserts to proper height and angle specifications. The fixture may include an upright main body with a removable insert for receiving an end of a chamfering tool of interest. The insert may include several raised support pads for supporting the chamfering tool in an elevated position. The fixture may also employ chamfering tool clamping mechanisms to securely clamp the chamfering tool to the fixture. The clamping mechanisms may include a feature that allows for proper clamping pressure to be exerted on a given chamfering tool even if a flange portion thereof is somewhat thicker or thinner than expected. One or more locating pins or other locating elements may also be employed to ensure repeatable location of a chamfering tool to the fixture.

26 Claims, 9 Drawing Sheets

FIXTURE FOR HOLDING A CHAMFERING TOOL DURING CUTTING INSERT PRESET OPERATION

BACKGROUND OF THE INVENTIVE FIELD

The present invention is directed to a fixture for securely retaining a chamfering tool in a repeatable position during the process of presetting its associated cutting inserts. For example, such a fixture may be used in the presetting of cutting insert height and/or angle.

Hole chamfering tools as considered in the present invention may be used to chamfer holes in various articles. For example, in the automotive field, such chamfering tools may be used to impart a desired angle to a valve seat.

Generally, such chamfering tools have a number of cutting inserts that are provided to produce the desired machining. For example, such a chamfering tool may be provided with three cutting inserts spaced about the circumference of a body portion thereof. As such, when the chamfering tool is rotatably driven by appropriate machinery, the cutting inserts cause a chamfering of a hole of interest.

Both the height and the angle settings of the cutting inserts with respect to the chamfering tool body are generally critical to proper tool performance. Consequently, both the height and the angle of the cutting inserts must be preset prior to use of the tool.

In some chamfering tools, the height and angle of each cutting insert may be the same. It is known however, that some chamfering tools employ cutting inserts wherein at least the angle of each cutting insert with respect to the chamfering tool body is different than the angle of the other cutting inserts. Further, it should be realized that even minute deviations from the proper height and angle settings of the cutting inserts can result in unacceptable machining tolerances. Therefore, it should also be realized that proper setting of chamfering tool cutting insert position is critical, but can be a difficult and time-consuming task.

In order to facilitate the preset of chamfering tool cutting inserts, setup fixtures have been developed. For example, a setup fixture has been developed to assist in the proper positioning of the cutting inserts of a particular three-blade chamfering tool. However, it has been discovered that this fixture suffers from numerous deficiencies. For example, this known fixture employs adjustable clamps that permit an unacceptable variation in clamping force to be applied to the chamfering tool during cutting insert preset. Further, this known fixture is provided with a flat chamfering tool receiving surface that allows for the collection of dirt and other debris, the presence of which can be sufficient to undesirably influence the preset position of the chamfering tool with respect to the fixture.

This known fixture also includes an integral receiving aperture for receiving and centering the chamfering tool within the fixture. Unfortunately, this receiving aperture wears over time, which results in concentricity inaccuracies. Further deficiencies include, for example, an insufficient number of chamfering tool clamping points; the use of a simple clamp-only mechanism, which is inadequate to produce consistent contact location between the chamfering tool and an associated receiving surface of the fixture; and, the use of metal-on-metal clamping contact, which cannot account for slight variances in chamfering tool flange thickness.

Therefore, it can be understood from the foregoing comments that it would be desirable to provide a chamfering tool cutting insert setup fixture that can provide for more accurate and repeatable preset of chamfering tool cutting inserts. The fixture of the present invention provides such results.

SUMMARY OF THE GENERAL INVENTIVE CONCEPT

The fixture of the present invention addresses the deficiencies associated with the known fixture discussed above. The fixture of the present invention facilitates the accurate and repeatable preset of chamfering tool cutting inserts to proper height and angle specifications.

The fixture of the present invention includes an upright main body with a removable insert for receiving a projecting end of a chamfering tool of interest. The insert includes several raised support pads for contacting a flange of the chamfering tool, thereby minimizing the risk that dirt or other contaminants will alter the intended position of the chamfering tool with respect to the fixture.

The fixture also employs chamfering tool clamping mechanisms that make use of linear guide shafts to ensure that clamping consistently occurs in the same location. Additionally, the chamfering tool is clamped to the fixture at three points, which eliminates rocking of the fixtured tool and provides for a more evenly distributed clamping pressure. The location of the clamping points may be selected to closely mimic the locations on the chamfering tool flange that experience a clamping force when the chamfering tool is installed to a machine.

The clamping mechanisms employed may provide for no adjustment or may be non-adjustable without the use of special tools, etc. As such, fixture users are forced to use the clamping mechanisms in a condition that will always exert a predetermined and desired clamping force. That is, users will be prevented from adjusting the clamping mechanisms in a manner that results in an unintended clamping force. The clamping mechanisms of the fixture may also include pliant bushings on an end portion thereof, such that slight variations in chamfering tool flange thickness can be accommodated without deviating from the application of a desired amount of clamping force.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
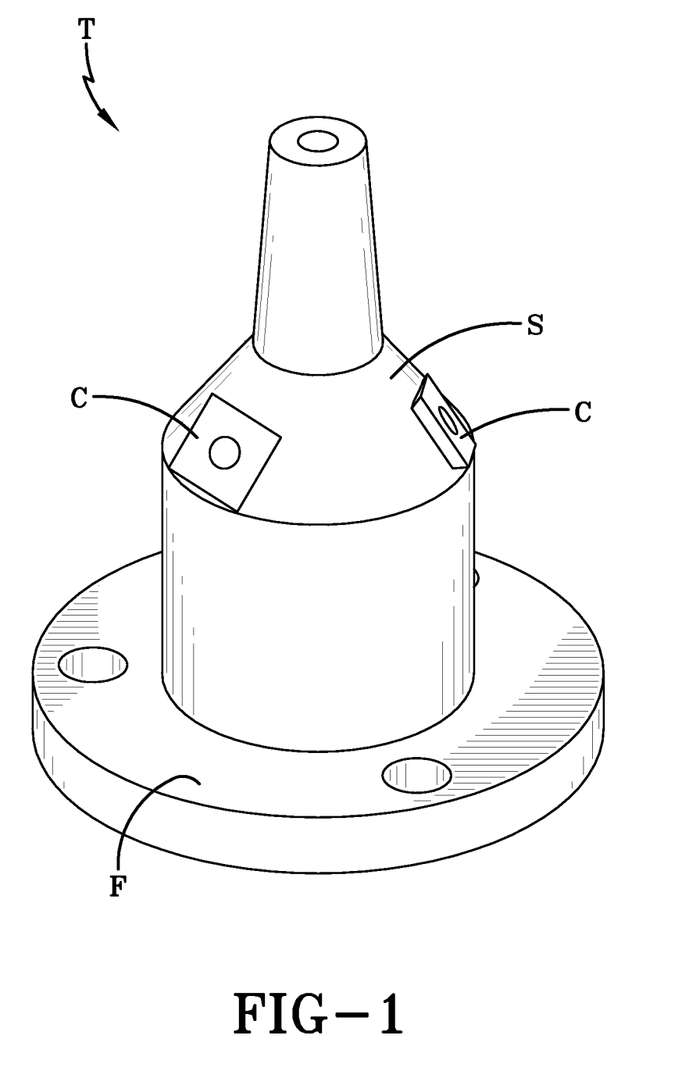
FIG. 1 depicts an exemplary chamfering tool, the cutting inserts of which can be preset using a fixture of the present invention.

An exemplary chamfering tool T whose cutting insert preset can be facilitated by use of a fixture of the present invention is depicted in FIG. 1. As can be observed, the chamfering tool T has an elongate and at least partially cylindrical body of varying diameter. One end of the chamfering tool T comprises a flange F having a diameter greater than that of the remainder of the chamfering tool body. A cylindrical body portion extends from the flanged end, and includes a shoulder S upon which is mounted three substantially equally-spaced cutting inserts C. A tapered shaft portion extends relatively from the shoulder S, so as to guide the chamfering tool T during use. The cutting inserts C must be preset to some predetermined height and angle with respect to the chamfering tool body prior to use of the chamfering tool T. A fixture of the present invention is designed for this purpose.

Figure 2:
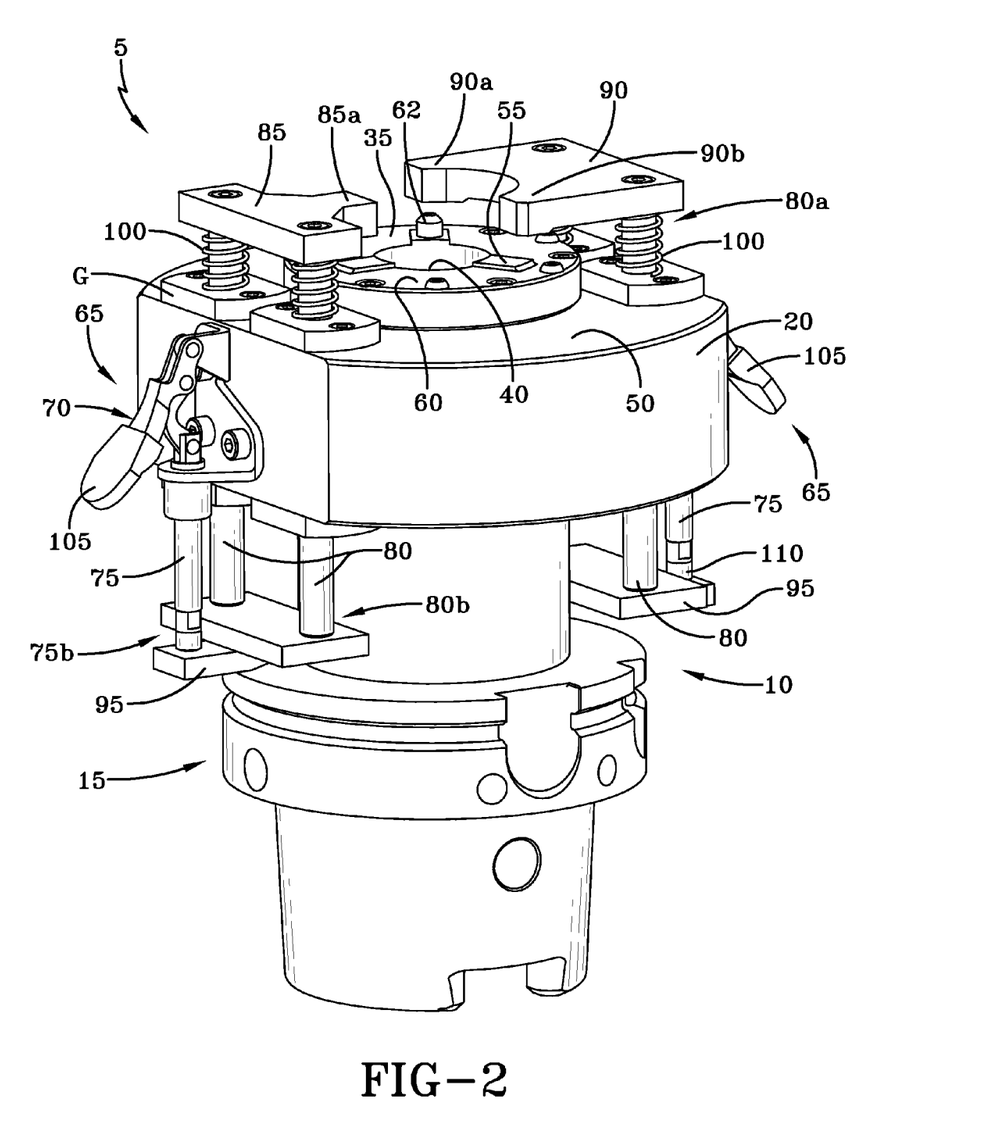
FIG. 2 is perspective view of one exemplary embodiment of an assembled fixture of the present invention.
Figure 3:
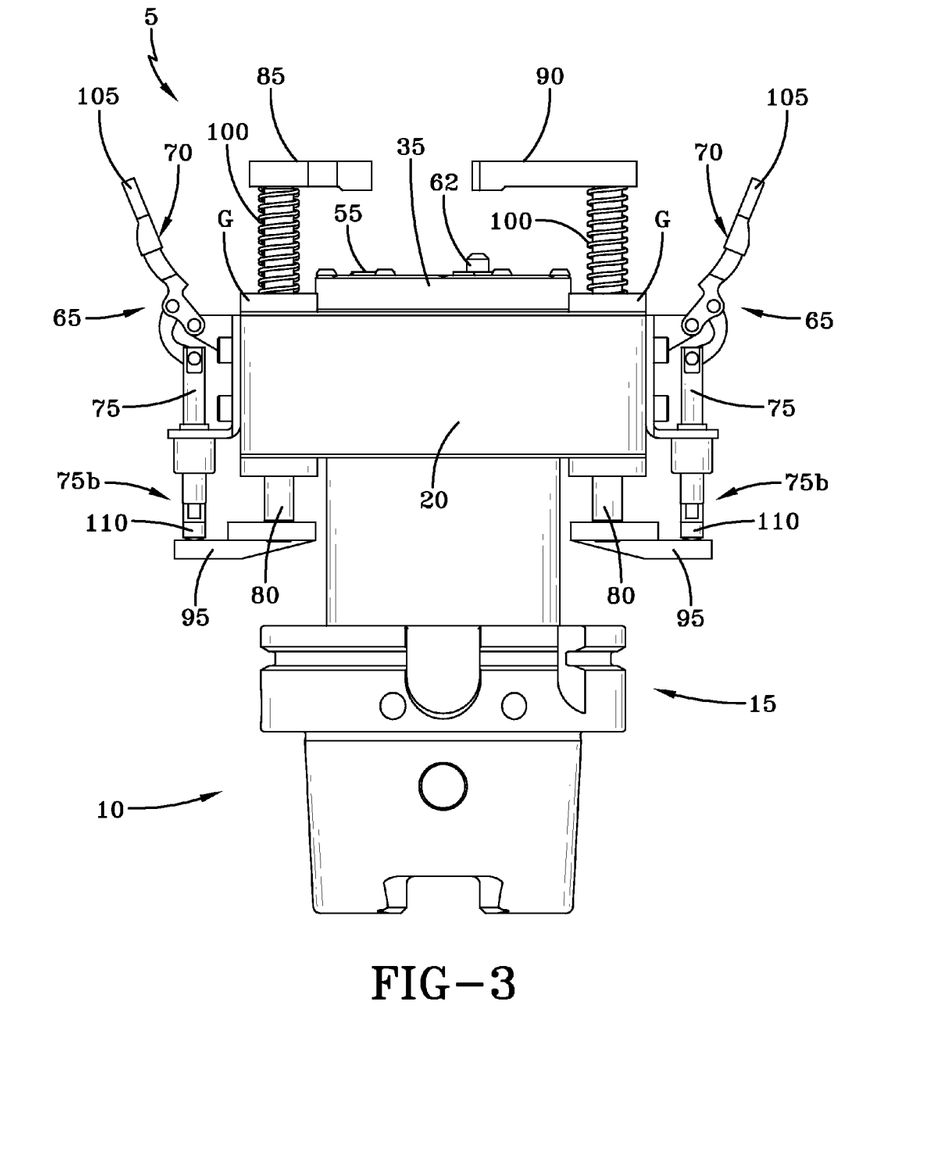
FIG. 3 is a side elevation view of the fixture of FIG. 2, but in an unclamped position.
Figure 4:
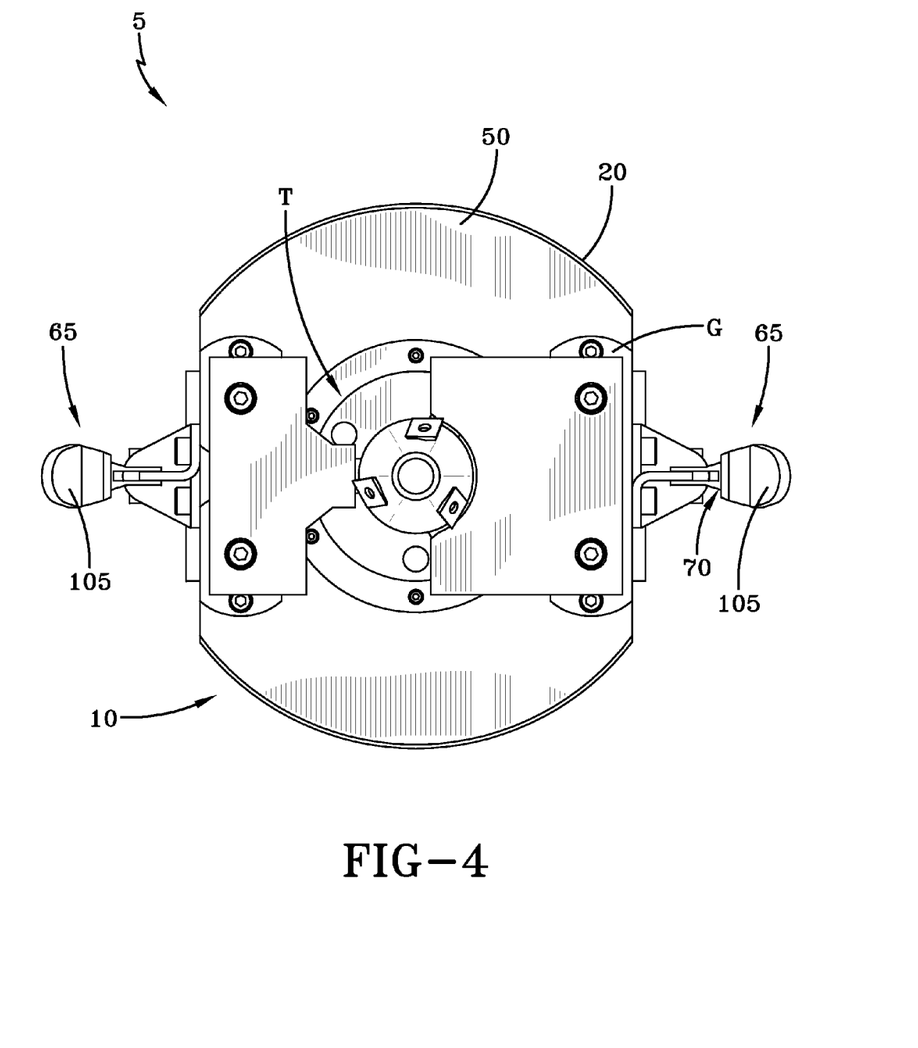
FIG. 4 is a top plan view of the fixture of FIG. 2, with the chamfering tool of FIG. 1 installed thereto.

An assembled view of one exemplary embodiment of a chamfering tool holding and clamping fixture (fixture) 5 of the present invention is illustrated in FIGS. 2-4. As shown, the fixture 5 includes an upright main body 10, which can be more clearly observed in FIGS. 5a-5c. The main body 10 may be machined or cast in its entirety or portions thereof may be machined or cast and subsequently assembled. However, it has been found more convenient to employ a tool holder for this purpose. For example, and not limitation, one or more of the HSK line of tool holders available from Kennametal, Inc. in Latrobe, Pa. may be used for this purpose. Using a commercially available tool holder allows for a greatly reduced amount of machining to be performed in constructing the fixture 5.

Figure 5A:
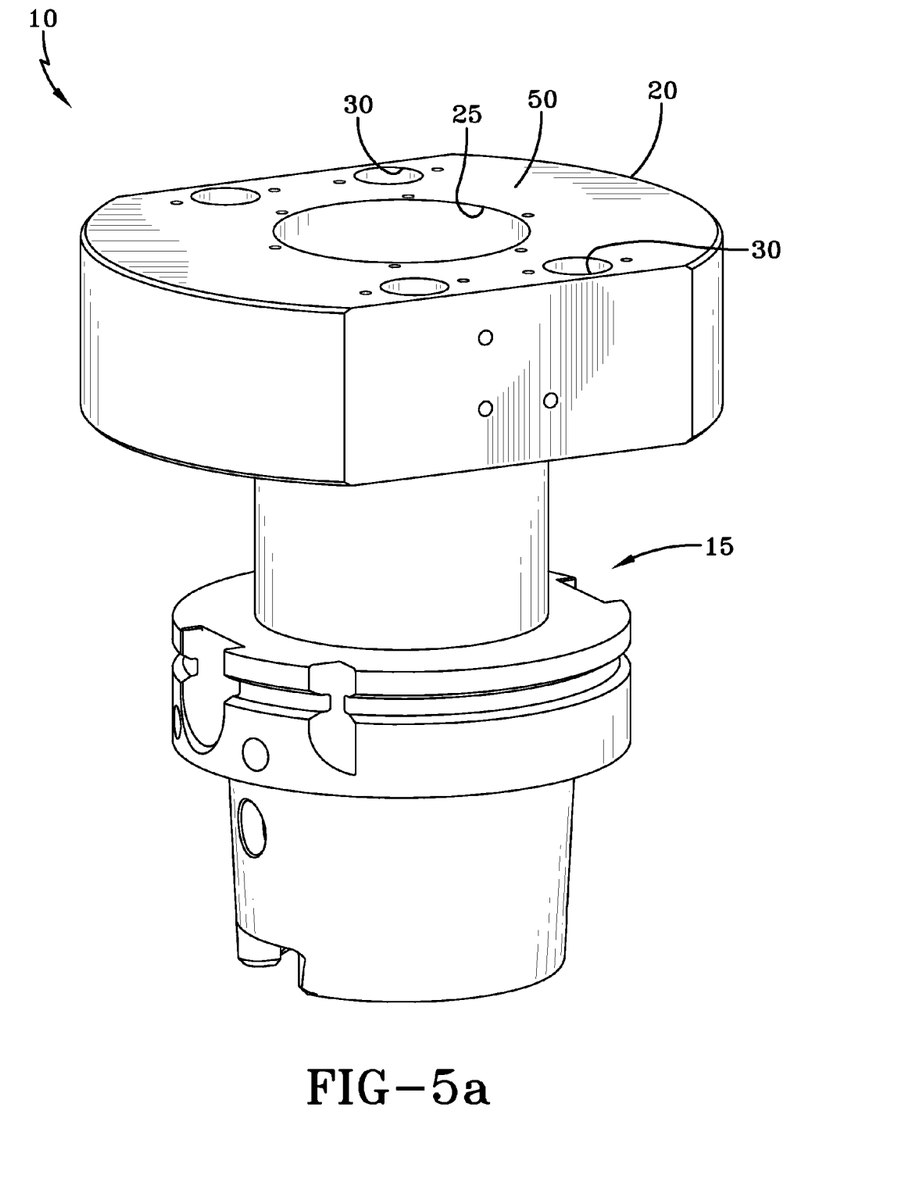
FIGS. 5a-5c are perspective, side elevation views, and top plan respectively, of a main body of the fixture of FIG. 2.
Figure 5B:
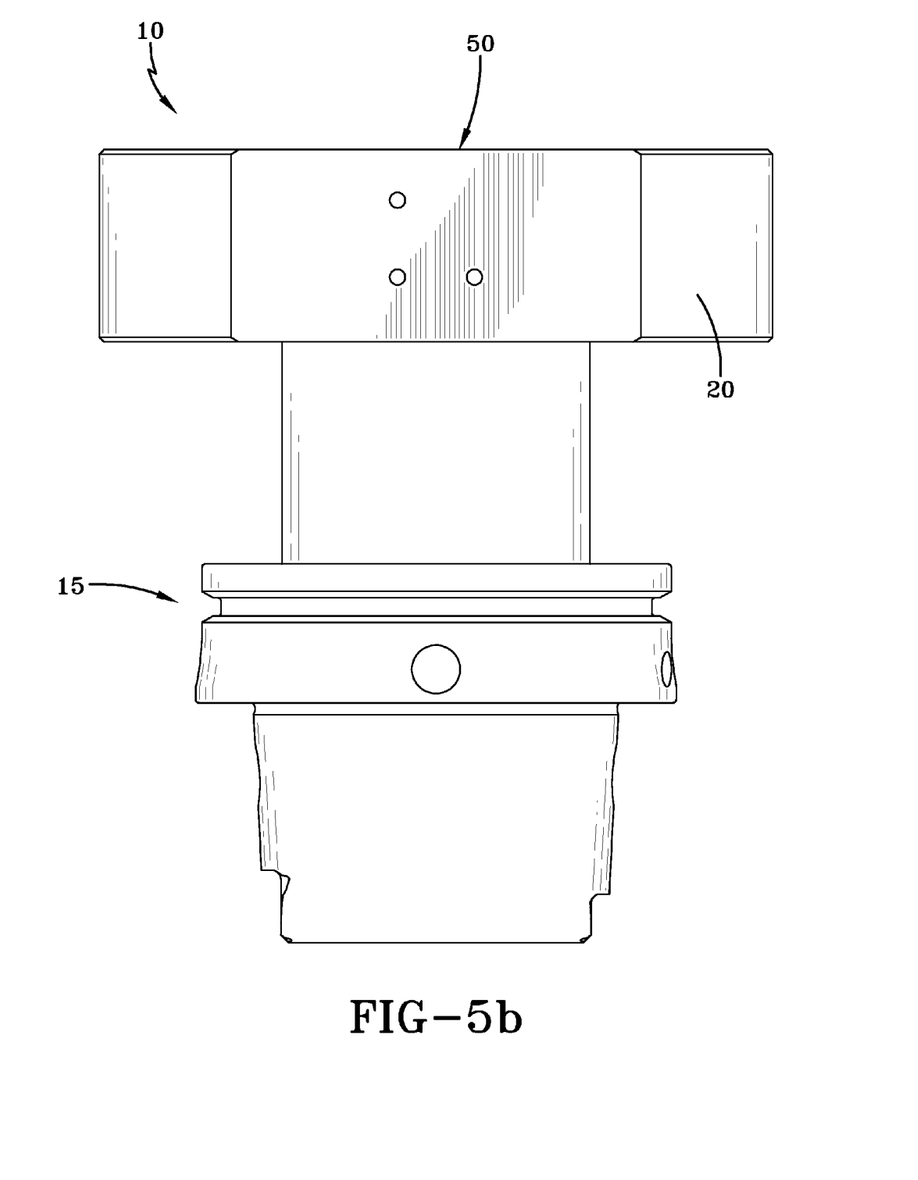
Figure 5C:
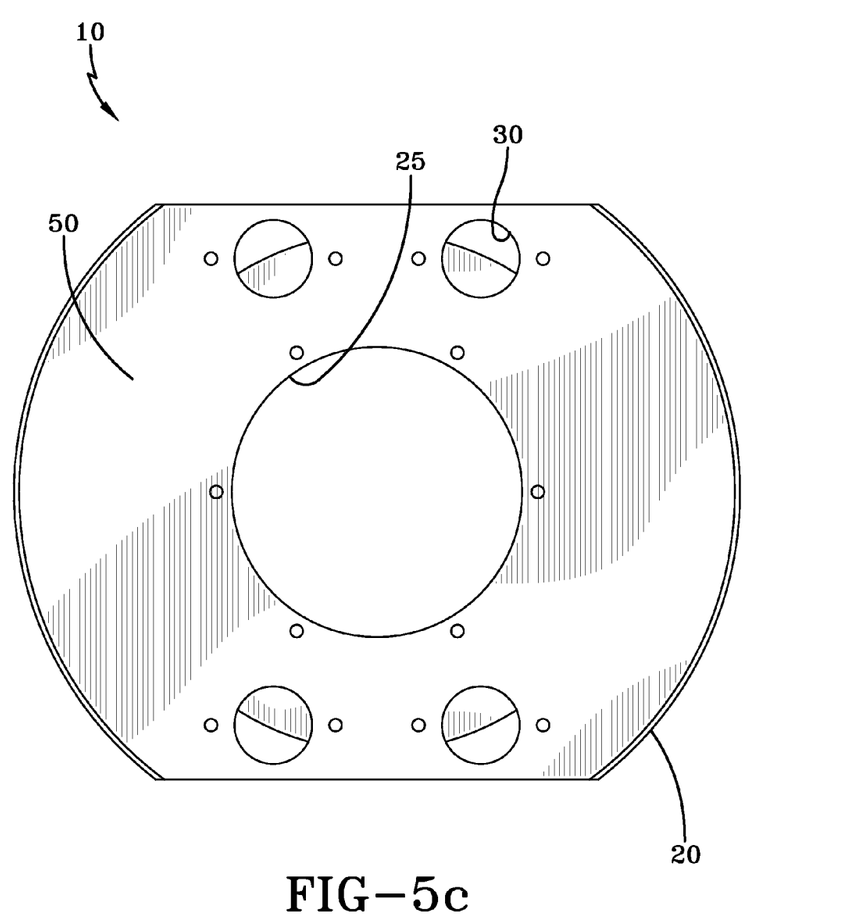

The main body 10 shown in FIGS. 5a-5c is comprised of a tool holder, as described above. Thus, the main body 10 of this embodiment includes a substantially cylindrical lower portion 15 which terminates in a flanged head portion that forms a base 20 for receiving and supporting a chamfering tool of interest. As would be apparent to one of skill in the art, the main body portion may have other constructions in alternate embodiments of the invention—whether said main body portion is comprised of a tool holder of is custom-fabricated. Therefore, nothing herein is to be interpreted as limiting a fixture of the present invention to the exact main body portion 10 shown and described herein.

As can be best observed in FIGS. 5a and 5b, the base 20 of this main body portion 10 includes a chamfering tool receiving aperture 25 that extends axially into the lower portion 15 thereof. A plurality of clamping mechanism guide rod holes 30 also extend through the base 20.

Figure 6:
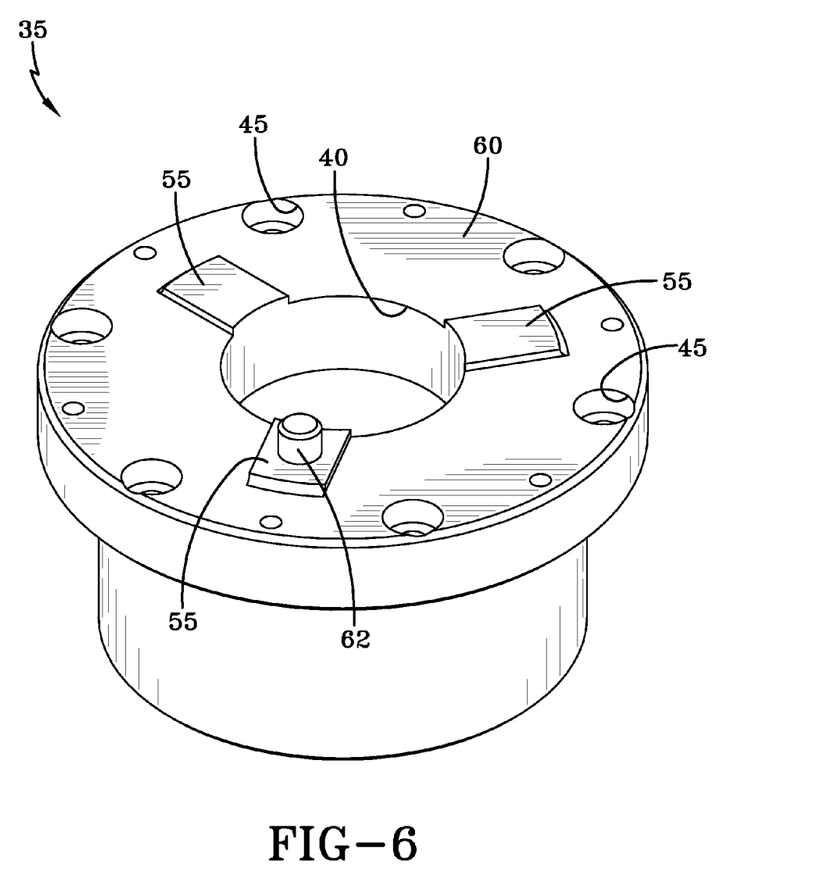
FIG. 6 is an enlarged perspective view of a chamfering tool receiving insert of the fixture of FIG. 2.

The chamfering tool receiving aperture 25 is designed to accept a chamfering tool receiving insert 35, which is shown in more detail in FIG. 6. The chamfering tool receiving insert 35 is provided with a central aperture 40 of a diameter that corresponds relatively to the diameter of a projection (not visible) extending from the underside of the flanged end of the chamfering tool T of FIG. 1. More specifically, the central aperture 40 of the chamfering tool receiving insert 35 is designed to accept the projection with a minimal gap therebetween.

The chamfering tool receiving insert 35 is shown to include a plurality of fastener holes 45, which allow for the passage therethrough of a number of fasteners by which the chamfering tool receiving insert can be secured to the face 50 of the base 20 and within the chamfering tool receiving aperture 25 of the main body 10. Of course, one skilled in the art would realize the chamfering tool receiving insert 35 may also be secured to the base 20 by a variety of other means including, but not limited to, being press fit into the chamfering tool receiving aperture 25. The removable design of the chamfering tool receiving insert 35 allows it to be changed when/if the central aperture 40 becomes excessively worn.

The chamfering tool receiving insert 35 is also shown to include three raised pads 55 which extend upward from a top surface 60 thereof. As will become more apparent from a further reading of the present description and examination of the drawing figures, the pads 55 form contact surfaces for engaging an underside of the chamfering tool flange F when the chamfering tool T is installed to the fixture 5. The use of the raised pads 55 instead of a continuous and flat contact surface minimizes the surface area upon which dirt and/or contamination may accumulate, thereby reducing the possibility that such contamination may adversely affect the positioning of the chamfering tool T with respect to the fixture 5. While this particular embodiment of the chamfering tool receiving insert 35 includes three raised pads 55, it should be apparent that more than three raised pads could also be used in other embodiments.

As also illustrated in FIGS. 2-4 and 6, the chamfering tool receiving insert 35 may optionally include a locating pin 62 or a similar locating element. In this embodiment, the locating pin 62 engages a corresponding aperture (not visible) in the underside of the chamfering tool flange F, thereby helping to ensure the proper and repeatable installation of the chamfering tool T to the fixture 5.

The fixture 5 also includes a pair of clamping assemblies 65 that function to securely clamp the chamfering tool T to the chamfering tool receiving insert 35. As most clearly shown in FIG. 7, the chamfering tool T is clamped by its flange F to the chamfering tool receiving insert 35.

Details of the clamping mechanisms 65 are best observed in FIGS. 2-3. As shown, a pair of straight-line action clamps 70 are affixed to opposite sides of the base 20 of the main body 10. The clamps 70 are arranged such that a plunger element 75 thereof is directed downward when the fixture 5 is in its normal working position, as shown in FIG. 1. Straight-line action clamps are well known and commercially available, and need not be discussed in detail herein. Such clamps may be purchased from, for example, De-Sta-Co Workholding in Auburn Hills, Mich.

The clamping mechanisms 65 also include at least one linear guide rod 80, although each clamping mechanism of this particular embodiment of the fixture 5 actually includes a pair of such linear guide rods. The linear guide rods 80 are shown to extend through the guide rod holes 30 in the base 20 of the main body 10. Guide plates G, linear bushings, and/or other components may be associated with the guide rod holes 30 to assist with smooth linear movement of the guide rods 80.

An upper and 80a of each linear guide rod 80 is coupled to a clamping arm 85, 90. In this particular embodiment of the fixture 5, the first clamping arm 85 is shown to include a single clamping lug 85a, while the second clamping arm 90 is shown to include a pair of clamping lugs 90a, 90b. The number and arrangement of clamping lugs may be different in other embodiments of a fixture of the present invention. As can be observed in FIG. 2, the clamping lugs 85a, 90a, 90b are preferably arranged so as to substantially overlie the position of the raised pads 55 of the chamfering tool receiving insert 35. Such an arrangement allows the clamping force produced by the clamping mechanisms 65 to be centered over the areas of contact between the flange F of the chamfering tool T and the chamfering tool receiving insert 35.

Referring still to FIGS. 2-3, it can be seen that the lower end 80b of each linear guide rod 80 is coupled to a clamping actuation bracket 95. The clamping actuation brackets 95 extend substantially laterally from the lower ends 80b of the linear guide rods 80, so as to intersect the path of the clamp plunger elements 75 of their respective clamping assemblies 65. The lower end 75b of the clamp plunger elements 75 need not be attached to the clamping actuation brackets 95. Consequently, when the clamping mechanisms 65 are in an unclamped state, the clamping actuation brackets 95 may or may not be in contact with the lower end 75b of their respective clamp plunger elements 75.

At least one spring 100 is preferably located between each clamping arm 85, 90 and the base 20 (or guide plate G, etc., mounted to the base). In this particular embodiment, each clamping arm is associated with two springs 100, each of which surrounds a corresponding linear guide rod 80. Consequently, the springs 100 are trapped between the respective clamping arms 85, 90 and the guide plates G (base 20), and provide an upward force that biases the clamping arms away from the base when the clamping mechanisms 65 are in an unclamped state. While the clamping mechanisms 65 could function without the springs 100, the use of springs in this manner maintains the clamping arms 85, 90 in an elevated position above the top face 50 of the base 20, thereby facilitating loading and unloading of the chamfering tool T to and from the fixture 5.

Operation of the clamping mechanisms 65 can be readily understood by reference to FIGS. 2 and 3, wherein the clamping mechanisms are shown in a clamped and unclamped position, respectively. To operate an unclamped clamping mechanism 65, a user grasps a handle 105 of the associated clamp 70 (which would be angled upward as shown in FIG. 3) and rotates the handle downward to the position shown in FIG. 2. By rotating the handle 105 as described, the plunger element 75 of the clamp 70 is moved downward, where it presses against the clamping actuation bracket 95 and pulls the linear guide rods 80 and attached clamping arms 85, 90 downward, locking the clamping arms into secure clamping contact with the flange F of the chamfering tool T (as shown in FIG. 7).

As illustrated in FIGS. 2-3, the lower (free) end of the clamp plunger elements 75 may be equipped with a compressible bumper 110 that contacts the respective clamping actuation brackets 95 when the clamps 70 are placed in a clamped position. Use of a compressible bumper 110 may allow the clamping mechanisms 65 to produce the desired amount of clamping force even when the flange of a given chamfering tool is somewhat thicker than expected (wherein the clamps may not otherwise reach the fully clamped position). The hardness and overall compressibility of the bumper material may vary, but it is contemplated that use of such bumpers should only compensate for very minor differences in flange thickness. In other words, the bumpers 110 are not provided to alter the amount of clamping force exerted by the clamping mechanisms 65, nor to account for substantial dissimilarities in flange thickness.

In use, the fixture 5 is placed on a stable work surface associated with an area in which cutting insert preset is performed. Generally, the fixture 5 will likely be maintained in a fixed location so as to better guarantee the repeatable positioning of the chamfering tool T. With the clamping mechanisms 65 in an unclamped state, the chamfering tool T is installed to the fixture 5 such that the projection on its bottom surface is received in the central aperture 40 of the chamfering tool receiving insert 35. In this particular exemplary embodiment, the chamfering tool T is also positioned such that the locating pin 62 enters the corresponding receiving aperture in the bottom surface of the chamfering tool flange F. As such, the bottom surface of the flange F rests on the top surface of the raised pads 55 and the chamfering tool T is centered within the central aperture 40 of the chamfering tool receiving insert 35 and the chamfering tool receiving aperture 25 in the base 20.

Figure 7:
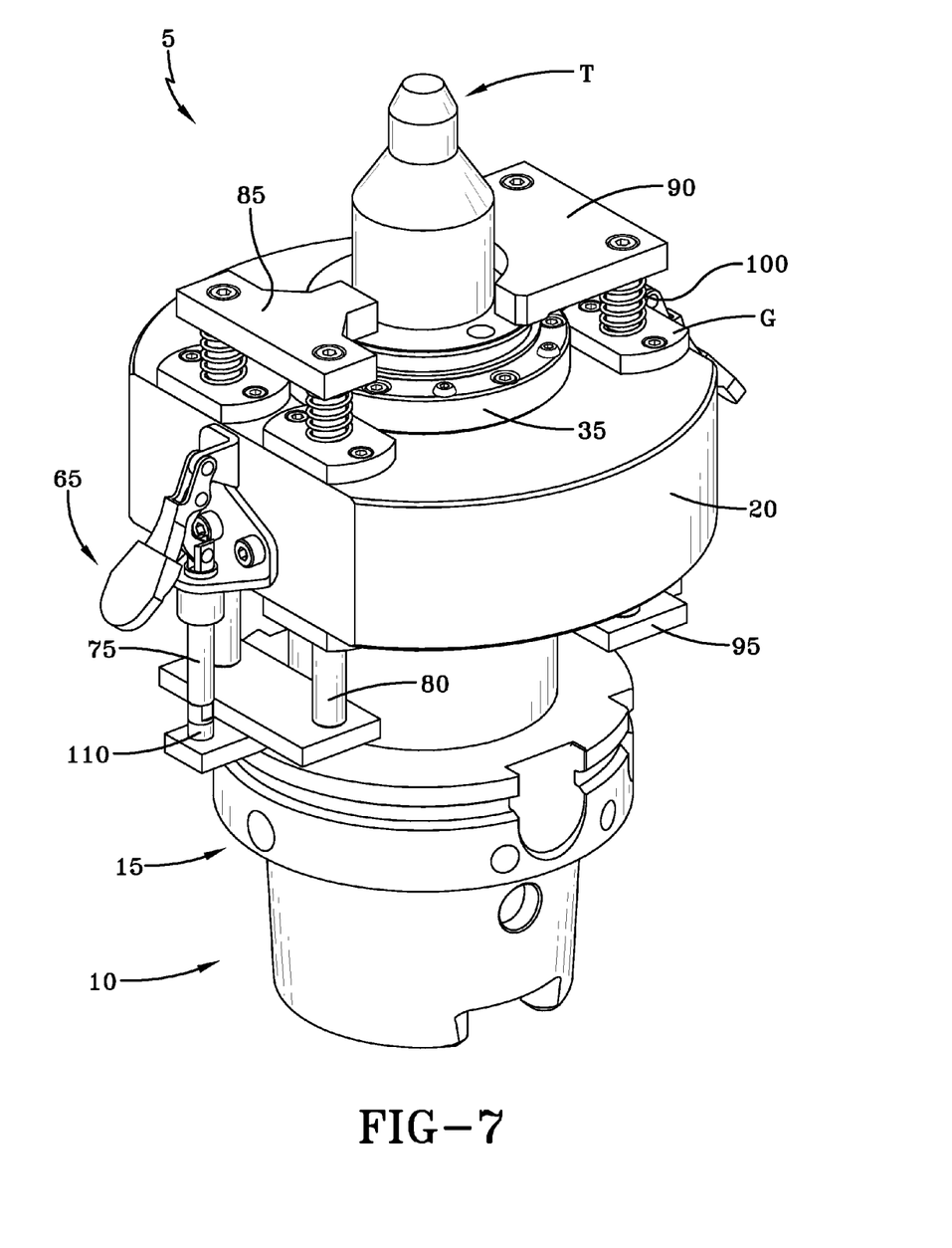
FIG. 7 depicts a chamfering tool in a clamped position within the fixture of FIG. 2.

With the chamfering tool T in this position, a user operates the clamping mechanisms 65 as described above to draw the clamping arms 85, 90 tightly against the flange F thereof as shown in FIG. 7. The chamfering tool T is thereby securely retained in a fixture 5 in a known and repeatable position. Consequently, a user can accurately and reliably preset the height and angle of the chamfering tool cutting inserts C.

An exemplary embodiment of the present invention has been described in detail above for purposes of illustration. However, it would be apparent to one of skill in the art that modifications to the exemplary embodiment may be made without departing from the spirit and scope of the present invention. Consequently, the scope of the present invention is not to be considered limited by such disclosure, and modifications are possible without departing from the spirit of the invention as evidenced by the following claims:

What is claimed is:

1. A fixture for holding a chamfering tool during a cutting insert preset operation, comprising:
a main body for supporting a chamfering tool of interest;
a chamfering tool receiving insert affixed to a top surface of said main body, said chamfering tool receiving insert adapted to receive a portion of said chamfering tool of interest;
a plurality of raised pads extending upward from a top surface of said chamfering tool receiving insert, such that said chamfering tool of interest will be supported on said pads and above a remaining upper surface of said chamfering tool receiving insert; and
at least two clamping mechanisms for securely clamping said chamfering tool of interest to said fixture, each of said clamping mechanisms including: a clamping arm; at least one linear guide rod passing through an associated hole in said main body, said at least one linear guide rod coupled at an upper end to said clamping arm and at a lower end to a clamping actuation bracket; and a straight-line clamp attached to an exterior surface of said main body and oriented such that actuation of said clamp will cause a plunger element thereof to contact and displace said clamping actuation bracket, thereby forcing said attached clamping arm against said chamfering tool of interest so as to clamp said chamfering tool of interest against said raised pads of said chamfering tool receiving insert.

2. The fixture of claim 1, further comprising a locating element on said chamfering tool receiving insert, said locating element adapted to engage a corresponding aperture in said chamfering tool of interest.

3. The fixture of claim 1, further comprising at least one spring located between said clamping arm of each clamping mechanism and said top surface of said main body.

4. The fixture of claim 3, wherein said at least one spring surrounds a portion of a linear guide rod associated with said clamping arm.

5. The fixture of claim 1, further comprising a guide element associated with each hole through which a linear guide rod of each clamping mechanism passes.

6. The fixture of claim 1, wherein each clamping arm includes one or more projecting clamping lugs that are adapted to produce limited areas of contact with said chamfering tool of interest and to exert a clamping force thereon.

7. The fixture of claim 6, wherein two clamping arms are present, one clamping arm having a single clamping lug and the other clamping arm having a pair of clamping lugs, said clamping lugs arranged so as to substantially overlie three raised pads that extend upward from said chamfering tool receiving insert.

8. The fixture of claim 1, wherein each clamping mechanism includes two linear guide rods.

9. The fixture of claim 1, wherein said chamfering tool receiving insert is removable.

10. The fixture of claim 1, further comprising a pliant bumper on a contacting end of said clamp plunger element, compression of said pliant bumper permitting clamping of said clamping mechanisms when a clamped portion of said chamfering tool of interest is thicker or thinner than expected.

11. The fixture of claim 1, wherein said main body is a tool holder.

12. A fixture for holding a chamfering tool during a cutting insert preset operation, comprising:
   a main body having a lower portion and a flanged head portion that forms an upper base, said main body for supporting a chamfering tool of interest;
   a removable chamfering tool receiving insert affixed to a top surface of said base, said chamfering tool receiving insert adapted to receive a projecting portion on one end of said chamfering tool of interest;
   at least three raised pads extending upward from a top surface of said chamfering tool receiving insert, such that said chamfering tool of interest will be supported on said pads and above a remaining upper surface of said chamfering tool receiving insert; and
   at least two clamping mechanisms for securely clamping said chamfering tool of interest to said fixture, each of said clamping mechanisms including; a clamping arm; at least one linear guide rod passing through a corresponding hole in said flanged head portion such that an upper and lower end of each guide rod protrudes therefrom, said at least one linear guide rod coupled at said upper end to said clamping arm and at said lower end to a clamping actuation bracket; and a straight-line clamp attached to an exterior surface of said base, said clamp having a displaceable plunger element and oriented such that actuation of said clamp causes said plunger element to move downward while impinging on said clamping actuation bracket, thereby forcing said clamping arm against said chamfering tool of interest so as to clamp said chamfering tool of interest against said raised pads of said chamfering tool receiving insert.

13. The fixture of claim 12, further comprising a locating element on said chamfering tool receiving insert, said locating element adapted to engage a corresponding aperture in said chamfering tool of interest.

14. The fixture of claim 12, further comprising a spring located between said clamping arm of each clamping mechanism and said top surface of said base.

15. The fixture of claim 12, further comprising a guide element associated with each hole in said base through which a linear guide rod of each clamping mechanism passes.

16. The fixture of claim 12, wherein each clamping arm includes one or more projecting clamping lugs that are adapted to produce limited areas of contact with said chamfering tool of interest and to exert a clamping force thereon.

17. The fixture of claim 16, wherein two clamping arms are present, one clamping arm having a single clamping lug and the other clamping arm having a pair of clamping lugs, said clamping lugs arranged so as to substantially overlie three raised pads that extend upward from said chamfering tool receiving insert.

18. The fixture of claim 12, wherein said chamfering tool receiving insert is removable.

19. The fixture of claim 12, further comprising a pliant bumper on a contacting end of said clamp plunger element, compression of said pliant bumper permitting clamping of said clamping mechanisms when a clamped portion of said chamfering tool of interest is thicker than expected.

20. The fixture of claim 12, wherein said main body is a tool holder.

21. A fixture for holding a chamfering tool during a cutting insert preset operation, comprising:
   a main body having a lower portion and an upper base, said main body for supporting a chamfering tool of interest;
   a removable chamfering tool receiving insert affixed to a top surface of said base, a portion of said chamfering tool receiving insert received in an aperture in said base, said chamfering tool receiving insert adapted to receive a projection extending from a flanged end of said chamfering tool of interest;
   at least three raised pads extending upward from a top surface of said chamfering tool receiving insert, such that said chamfering tool of interest will be supported on said pads and above a remaining upper surface of said chamfering tool receiving insert by contact between said pads and a flange of said chamfering tool; and
   a pair of clamping mechanisms for securely clamping a flange of said chamfering tool of interest to said fixture, each of said clamping mechanisms further comprising:
      a pair of linear guide rods passing through guide elements associated with corresponding holes in said base,
      a clamping arm coupled to an upper end of said linear guide rods,
      at least one spring located between said clamping arm and said top surface of said base,
      a clamping actuation bracket coupled to a lower end of said linear guide rods, and
      a straight-line clamp attached to an exterior side of said base, said clamp having a displaceable plunger element and oriented such that actuation of said clamp causes said plunger element to move downward,
   wherein actuation of said clamps of said clamping mechanisms will cause said plunger element to move said clamping actuation bracket and said attached guide rods and clamping arms downward, thereby forcing said clamping arms against a flange of said chamfering tool of interest so as to clamp said chamfering tool of interest against said raised pads of said chamfering tool receiving insert.

22. The fixture of claim 21, further comprising a locating element on said chamfering tool receiving insert, said locating element adapted to engage a corresponding aperture in a flange of said chamfering tool of interest.

23. The fixture of claim 21, wherein each clamping arm includes one or more projecting clamping lugs that are adapted to produce limited areas of contact with said chamfering tool of interest and to exert a clamping force thereon, at least three total clamping lugs present on said pair of clamping arms.

24. The fixture of claim 23, wherein one clamping arm has a single clamping lug and the other clamping arm has a pair of clamping lugs, said clamping lugs arranged so as to substantially overlie three raised pads that extend upward from said chamfering tool receiving insert.

25. The fixture of claim 21, further comprising a pliant bumper on a contacting end of said clamp plunger element, compression of said pliant bumper permitting clamping of said clamping mechanisms when a clamped portion of said chamfering tool of interest is thicker or thinner than expected.

26. The fixture of claim 21, wherein said main body is a tool holder.

* * * * *